United States Patent [19]

Matson et al.

[11] Patent Number: 5,214,325
[45] Date of Patent: May 25, 1993

[54] METHODS AND APPARATUS FOR VENTILATING ELECTRIC MACHINES

[75] Inventors: Thomas J. Matson; Gordon A. Osborn, both of Erie, Pa.

[73] Assignee: General Electric Company, Erie, Pa.

[21] Appl. No.: 633,650

[22] Filed: Dec. 20, 1990

[51] Int. Cl.$^5$ .......................... H02K 9/00; H02K 9/02; H02K 9/06
[52] U.S. Cl. ........................................ 310/58; 310/59; 310/62
[58] Field of Search ................... 310/52, 58, 59, 62, 310/63, 255

[56] References Cited

U.S. PATENT DOCUMENTS

| | | | |
|---|---|---|---|
| 1,784,102 | 12/1930 | Lincoln et al. | 310/62 |
| 4,409,502 | 10/1983 | McCabria | 310/61 |
| 4,562,367 | 12/1985 | Kumatani | 310/62 |

FOREIGN PATENT DOCUMENTS

| | | | |
|---|---|---|---|
| 0598157 | 5/1960 | Canada | 310/63 |
| 2910845 | 10/1980 | Fed. Rep. of Germany . | |
| 0085307 | 7/1978 | Japan | 310/62 |
| 341164 | 1/1931 | United Kingdom . | |
| 0546760 | 7/1942 | United Kingdom | 310/62 |

Primary Examiner—Steven L. Stephan
Assistant Examiner—C. LaBalle
Attorney, Agent, or Firm—R. Thomas Payne

[57] ABSTRACT

A rotating electric machine includes a housing having a first inlet at one end for admitting ventilation air for cooling the machine, and a second inlet at the other end which also admits cooling air into the machine. A fan located at one end of the housing draws air into the housing through the first and second inlets, and forces it out of the housing through a single outlet located near one end of the housing. Air entering the second inlet passes through openings in the fan carrier, cooling isolated areas of the rotor, and flowing through the fan blades with the air which enters through the first inlet.

4 Claims, 2 Drawing Sheets

METHODS AND APPARATUS FOR VENTILATING ELECTRIC MACHINES

This invention relates to methods and apparatus for ventilating electric machines, and more particularly, to methods and apparatus for more evenly cooling electric machines by drawing air into both ends of the machine.

BACKGROUND OF THE INVENTION

Electric machines such as traction motors generate heat which must be removed efficiently to prevent permanent damage to the motor. An internal fan is commonly used to cool the machine by drawing outside air over the motor coils. The air is drawn into the motor through openings in one end of the motor housing, and is blown out of the motor through the other end. However, there are spaces over which the air does not pass, isolating portions of the motor from the cooling air. This causes increased temperature rises in the machine and can cause overheating and shorter insulation life, which are undesirable. For this reason, there is a need for methods and apparatus for providing cooling air to otherwise isolated parts of the machine.

Accordingly, one object of this invention is to provide new and improved methods and apparatus for ventilating rotating electric machines.

Another object is to provide new and improved methods and apparatus for more evenly cooling electric machines.

Still another object is to provide new and improved methods and apparatus for ventilating electric machines which reduce overheating in isolated parts of the machine.

Yet another object is to provide new and improved methods and apparatus for ventilating electric machines by drawing outside air through both ends of the machine housing.

SUMMARY OF THE INVENTION

In keeping with one aspect of this invention, a rotating electric machine includes a housing, a stationary stator in the housing, and an internal rotor rotatably secured to the housing within the stator. The rotor is secured to a central shaft, and a fan is also secured to the shaft at one end of the rotor.

The housing has a first inlet at one end for admitting cooling air into the machine, and a second inlet at the other end which equalizes the pressure across the bearing seals and also admits cooling air into the machine. The fan forces air drawn into the housing through the first and second inlets out of the housing through a single outlet in the housing.

The fan has a plurality of blades attached to a fan carrier. Air which is drawn in through the second inlet passes through openings in the fan carrier across a section of the rotor which is isolated from the air which enters through the first inlet. The air which passes through the openings in the fan carrier is drawn through the fan blades in the same direction as the air which enters through the first inlet.

BRIEF DESCRIPTION OF THE DRAWINGS

The above mentioned and other features of an embodiment of this invention and the manner of obtaining them will become more apparent, and will be best understood by reference to the following description, taken in conjunction with the accompanying drawings, in which.

DETAILED DESCRIPTION

Figure 1:
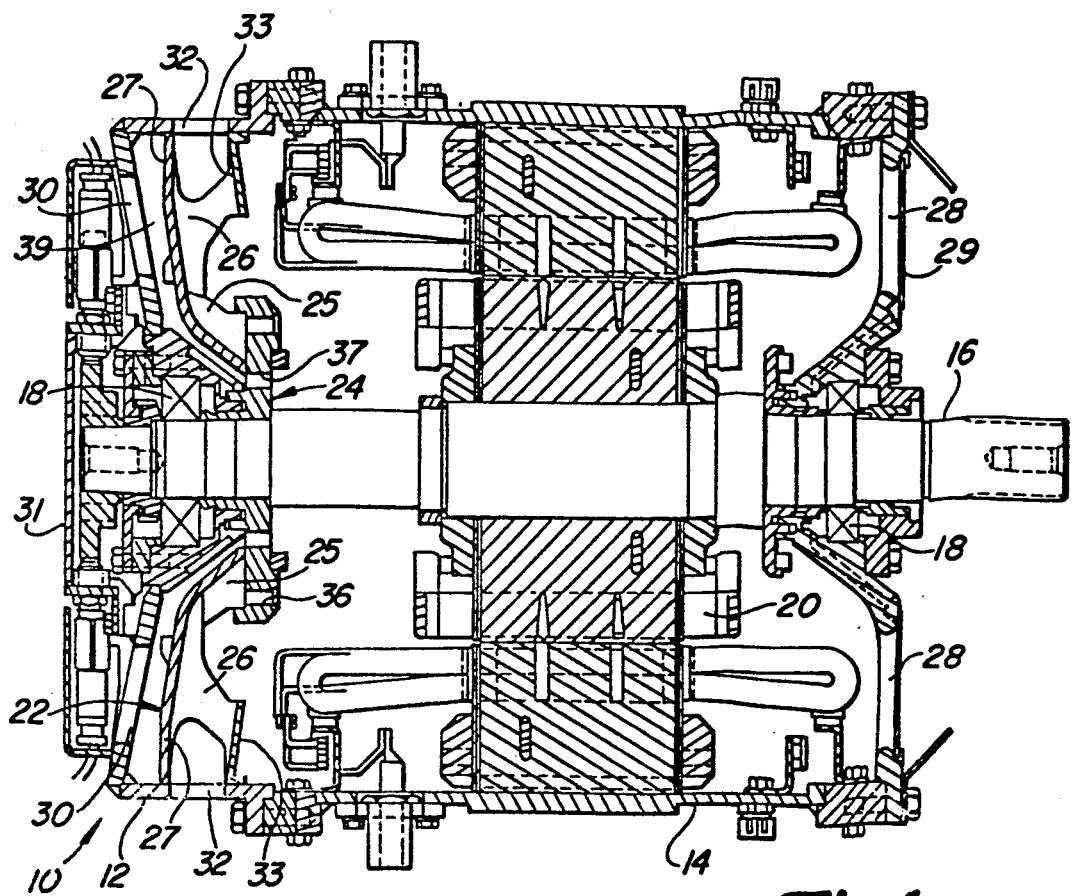
FIG. 1 is a cross-sectional view of a rotating electric machine made in accordance with the principles of this invention.

As seen in FIG. 1, a rotating electric machine 10 such as a traction motor or the like includes a housing 12 and a stationary stator 14 secured to the housing 12. A central shaft 16 is secured in the housing 12 by bearings 18 at either end of the housing 12, and a rotor 20 is secured to the shaft 16.

A fan 22 is rotated by the shaft 16. The fan 22 is secured to a fan carrier 24, which in turn is secured to the shaft 16. The fan 22 includes a hub 25, plurality of blades 26 and a shroud 27, which is solid and does not pass air. The blades 26 are oriented to move cooling air through the housing 12. A second shroud 33 can be provided, and the fan 22 can be an assembly of parts, or made from a single casting.

The housing 12 includes a first inlet 28 at one end 29, and a second inlet 30 at the other end 31. A single outlet 32 is provided towards the end 31 for exhausting air out of the housing 12. The shroud 27, together with the blades 26, directs the air through the outlet 32. However, the shroud 27 isolates air which enters the first inlet 28 from air entering through the second inlet 30. The functions of the inlets and outlet could be reversed, if desired, by changing the design of the fan 20.

Figure 2:
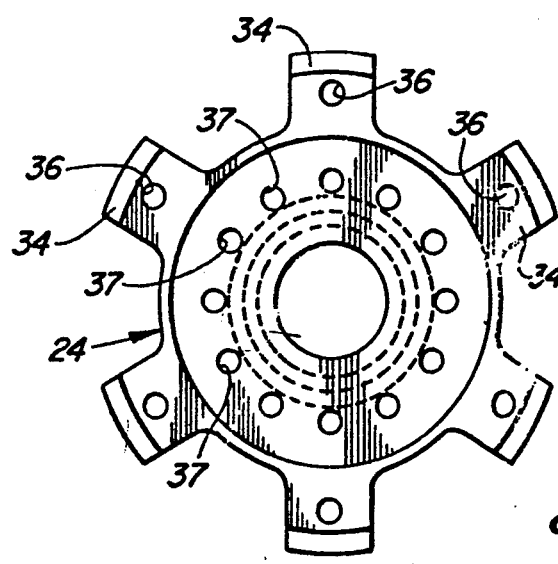
FIG. 2 is an end view of the fan blade carrier in the apparatus shown in FIG. 1.
Figure 3:
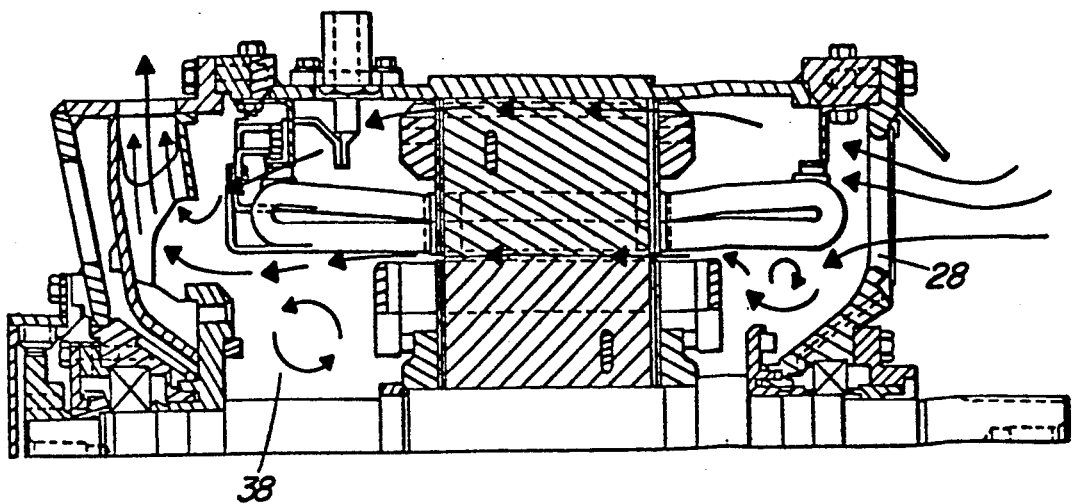
FIG. 3 is a cross-sectional view of one half of a prior art rotating electric machine, showing the manner in which air flows through the machine during use.

The fan carrier 24 (FIG. 2) includes a plurality of equally spaced anchors 34, each blade anchor 34 having a tapped hole 36 for securing the fan hub 25 to the carrier 24. In addition, a plurality of openings 37 are provided in the carrier 24. Air which is drawn through the inlet 30 passes through an inlet channel 39, formed between the fan shroud 27 and the housing 12, through the openings 37, and into an internal chamber 38 formed between a portion of the rotor 20 and the fan 22 (FIG. 3). The air absorbs heat which is dissipated by the stator 14 and the rotor 20 in the chamber 38, and is drawn through the fan blades 26 and forced out the outlet 32. The openings 37 are preferably equally spaced around the fan carrier 24. Any suitable number of openings 37 may be provided, including the twelve openings 37 shown in FIG. 2.

The manner in which air circulates through a machine which does not have a second inlet 30 is shown in FIG. 3. Air entering the first inlet 28 passes over the rotor and stator, but does not circulate through the chamber 38. Thus, the chamber 38 is isolated from the stream of cooling air which passes through the machine.

Figure 4:
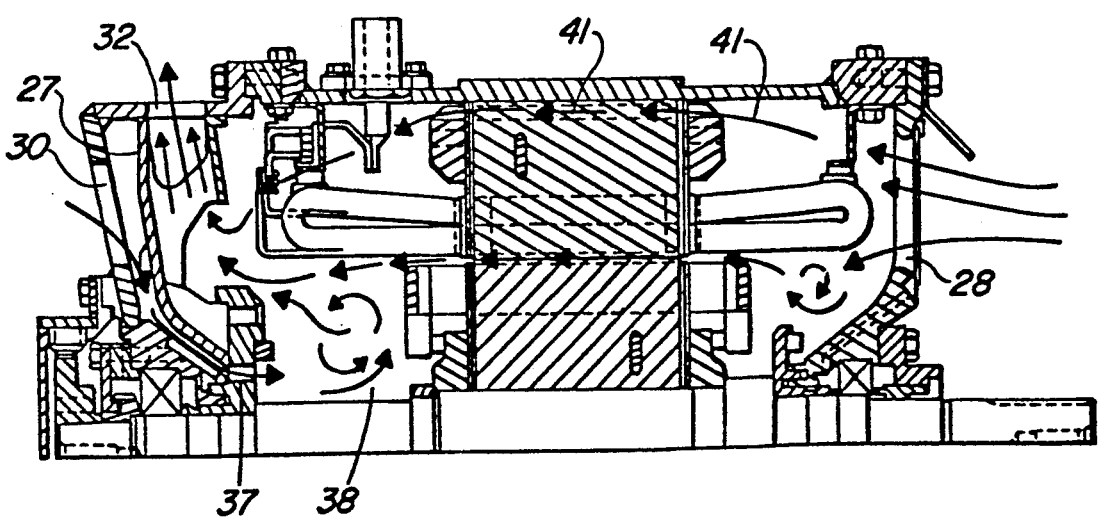
FIG. 4 is a cross-sectional view of one half of the machine shown in FIG. 1, showing the manner in which air flows through the machine during use.

FIG. 4 shows the manner in which air circulates through the machine 10 in the present invention. Ambient air which passes through the first inlet 28 is drawn over a path 41 which is formed by the housing 12, the stator 14 and the rotor 20. Ambient air which is drawn into the second inlet 30 passes through the chamber 38, cooling the portion of the machine which is adjacent the chamber 38. In addition, the air which enters through the second inlet 30 passes through the fan blades 26 and the outlet 32 in same direction as the air which enters through the first inlet 28.

In a machine actually built and tested, the temperature rise in the chamber 38 was lowered from about 160° C. to about 120° C. when the openings 36 were added. The reduced temperature rise is due to the additional ambient air being drawn in through the second inlet 30, and the reduced temperature of that, which is substantially cooler than air which enters through the first inlet 28 and has already passed over the machine coils, absorbing heat.

The many advantages of this invention are now apparent. The machine is more evenly cooled, and overheating is reduced, increasing the performance and life of the machine.

While the principles of the invention have been described above in connection with specific apparatus and applications, it is to be understood that this description is made only by way of example and not as a limitation on the scope of the invention.

We claim:

1. A rotating electric machine comprising:
a housing;
a stator operatively positioned in the housing;
a rotor having a central shaft operatively positioned in the housing, the housing further comprising:
a first inlet, operatively positioned at a first end, for admitting cooling air into the machine;
a second inlet, operatively positioned in a second end, the second end being opposite the first end, for admitting additional cooling air into the machine; and
an outlet, operatively positioned approximate the second end, for passing the cooling air and additional cooling air out of the machine; and
fan means for drawing the cooling air and the additional cooling air into the housing through the first and the second inlet and for exhausting the air out of the housing through the outlet, the fan means comprising:
a fan carrier operatively positioned on the shaft;
a plurality of fan blades, each extending outwardly from the fan carrier;
a shroud for isolating the additional cooling air from the outlet; and
a plurality of orifices operatively positioned in the fan carrier for moving the additional cooling air from the second inlet exclusively into an isolated chamber, mixing the additional cooling air with a small portion of the cooling air which moves from the first inlet through an air gap between the stator and the rotor proximate an upper portion of the isolated chamber, the additional and the cooling air then exiting the machine through the outlet.

2. A method for cooling a rotating electric machine, the machine comprising:
a housing having a first air inlet at a first end, a second air inlet at a second end, the second end being opposite the first end, and an air outlet;
a fan, operatively positioned proximate the second inlet, for drawing ambient air into the housing through the first inlet and additional ambient air from a second inlet through the fan into an isolated chamber located proximate the second inlet; the method comprising the steps of:
drawing the ambient air into the housing through the first inlet;
drawing the additional ambient air into the housing through the second inlet;
moving the additional ambient air through the fan and into the isolated chamber;
mixing the additional ambient air with a small portion of the ambient air which moves from the first inlet through an air gap between a stator and a rotor of the electric machine proximate an upper portion of the isolated chamber; and directing both the ambient air and the additional ambient air out of the machine through the outlet thereby providing air movement into, through and out of the isolated chamber.

3. A rotating electric machine comprising:
a housing having a first air inlet in one end for drawing cooling air into the housing, a second air inlet in the opposite end for drawing additional cooling air into the housing, and an outlet for exhausting the cooling air and the additional cooling air out of the machine;
a stator operatively positioned within the housing;
a rotor operatively positioned in the housing and secured to a shaft;
fan means, operatively positioned proximate the second inlet, for drawing the additional cooling air from the second inlet through a plurality of apertures operatively positioned therein and into an isolated chamber located proximate the second inlet;
the housing, stator and rotor, forming a path in the machine through which the cooling air passes from the first inlet to the outlet, the rotor and the housing forming the isolated chamber such that little if any cooling air enters therein, the additional cooling air exclusively entering the isolated chamber and moving from the isolated chamber into the path of the cooling air and out of the machine through the outlet.

4. A method for cooling a rotating electric machine, the machine comprising:
a housing having a first air inlet in one end for drawing cooling air therein, a second air inlet in the opposite end for drawing additional cooling air therein, and an outlet for exhausting the cooling air and the additional cooling air from the machine;
a stator operatively positioned in the housing;
a rotor operatively positioned in the housing on a shaft; and
a fan, operatively positioned proximate the second air inlet, for drawing the cooling air into the machine through the first inlet and the additional cooling air into the machine through the second inlet, through a plurality of apertures in the fan, the housing, stator and rotor forming a path through which the cooling air passes from the first inlet to the outlet, the rotor and housing forming an isolated chamber, proximate the second air inlet, out of the direct path of the cooling air, the method comprising the steps of:
drawing the cooling air into the housing through the first inlet;
drawing the additional cooling air into the housing through the second inlet;
moving the additional cooling air through the plurality of apertures in the fan exclusively into the isolated chamber;
moving the additional cooling air toward the outlet; and
exhausting the cooling air and the additional cooling air out of the housing through the outlet.

* * * * *